US012293358B2

United States Patent
Esquibel et al.

(10) Patent No.: US 12,293,358 B2
(45) Date of Patent: May 6, 2025

(54) MITIGATION OF CRYPTOGRAPHIC ASSET ATTACKS

(71) Applicant: Foolproof Labs LLC, Wilmington, DE (US)

(72) Inventors: Christopher Esquibel, Wilmington, DE (US); Emily Herrick, Wilmington, DE (US)

(73) Assignee: FOOLPROOF LABS LLC, Wilmington, DE (US)

( * ) Notice: Subject to any disclaimer, the term of this patent is extended or adjusted under 35 U.S.C. 154(b) by 133 days.

(21) Appl. No.: 18/466,510

(22) Filed: Sep. 13, 2023

(65) Prior Publication Data

US 2024/0086905 A1    Mar. 14, 2024

Related U.S. Application Data

(60) Provisional application No. 63/406,397, filed on Sep. 14, 2022.

(51) Int. Cl.
| | | |
|---|---|---|
| *G06Q 20/38* | (2012.01) | |
| *G06Q 20/02* | (2012.01) | |
| *G06Q 20/36* | (2012.01) | |
| *G06Q 30/018* | (2023.01) | |
| *G06Q 30/0645* | (2023.01) | |
| *G06Q 40/03* | (2023.01) | |
| *H04L 9/00* | (2022.01) | |
| *H04L 9/32* | (2006.01) | |

(52) U.S. Cl.
CPC ......... *G06Q 20/3825* (2013.01); *G06Q 20/02* (2013.01); *G06Q 20/3674* (2013.01); *G06Q 40/03* (2023.01)

(58) Field of Classification Search
CPC ............... G06Q 20/3825; G06Q 20/02; G06Q 20/3674; G06Q 20/3821; G06Q 20/38215; G06Q 20/3829; G06Q 40/03; G06Q 30/018; G06Q 30/0645; H04L 9/3213; H04L 9/3239; H04L 9/3247; H04L 9/50
USPC ............................................................ 705/75
See application file for complete search history.

(56) References Cited

U.S. PATENT DOCUMENTS

| | | | | |
|---|---|---|---|---|
| 9,674,699 | B2 * | 6/2017 | Kanov | ................ H04W 12/069 |
| 11,805,127 | B1 * | 10/2023 | Sundar | ................ H04L 63/0884 |
| 2022/0407702 | A1 * | 12/2022 | Jakobsson | ................ H04L 9/50 |

(Continued)

OTHER PUBLICATIONS

Luo et al "Understanding NFT Price Moves through Social Media Keywords Analysis", arXiv:2209.07706v1, Sep. 16, 2022, 9 pages (Year: 2022).*

*Primary Examiner* — James D Nigh

(74) *Attorney, Agent, or Firm* — Morris, Manning & Martin, LLP; Adam J. Thompson, Esq.

(57) ABSTRACT

Disclosed is a computing system and method for protecting access to a particular resource. The computing device can identify a first cryptographic token in a first digital wallet. The first cryptographic token is configured to provide access to a particular resource. The computing device can generate a second cryptographic token bound to the first cryptographic token. The computing device can transfer the second cryptographic token to a second digital wallet based on the first cryptographic token. The computing device can access the particular resource based on the second cryptographic token being in the second digital wallet.

20 Claims, 5 Drawing Sheets

(56) References Cited

U.S. PATENT DOCUMENTS

| | | | |
|---|---|---|---|
| 2023/0120485 A1* | 4/2023 | Shankar | H04L 9/3213 |
| | | | 713/159 |
| 2023/0214792 A1* | 7/2023 | Lee | G06Q 20/02 |
| | | | 705/75 |
| 2023/0325814 A1* | 10/2023 | Vijayan | G06Q 20/3829 |
| | | | 705/66 |
| 2023/0385815 A1* | 11/2023 | Jakobsson | G06Q 20/36 |

* cited by examiner

MITIGATION OF CRYPTOGRAPHIC ASSET ATTACKS

CROSS-REFERENCE TO RELATED APPLICATIONS

This application claims the benefit, and priority to U.S. Provisional Application No. 63/406,397, filed Sep. 14, 2022 and entitled "MITIGATION OF CRYPTOGRAPHIC ASSET ATTACKS," which is incorporated herein by reference in its entirety.

TECHNICAL FIELD

This application generally relates to systems and methods for securing cryptocurrencies and more specifically to systems and methods for providing third-party verifications of transactions and ownership associated with cryptocurrencies.

BACKGROUND

Cryptographic assets are typically stored on a decentralized ownership ledger, also referred to as a "blockchain." Proof of ownership and authority to transfer cryptographic assets is typically dependent upon a private key. A cryptocurrency wallet (referred to herein as a "digital wallet") is a device or program that stores a user's cryptocurrency key(s) and allows the user to access their cryptographic assets (e.g., including various actions, such as transferring ownership thereof). The digital wallet may include a public key (e.g., acting as a digital address for receiving and transferring cryptographic assets) and a corresponding private key used to sign and authorize transfers of cryptographic assets. Consequently, anyone with access to the private key may be capable of initiating transfer of the cryptographic assets associated therewith.

Previous approaches to digital wallet security, and lack thereof, may render a user's cryptographic assets vulnerable to theft or accidental transfer. An attacker may use a compromised digital wallet and/or private key to transfer ownership of a user's cryptographic assets from the user to the attacker. Further, an unauthorized or fraudulent transaction of crypto-assets may be irrevocable or irreversible, even by the true asset owner. Past digital wallet security solutions may be incapable of intercepting recovering crypto-assets following unauthorized or accidental initiation of transfer. Therefore, there is a long-felt but unresolved need for improved digital wallet security systems and processes.

BRIEF SUMMARY OF THE DISCLOSURE

Briefly described, and according to one embodiment, aspects of the present disclosure generally relate to systems and processes for securing cryptographic assets. In various embodiments, provided herein are systems and processes for monitoring and controlling transfers of cryptographic assets. In one or more embodiments, the transaction system shown and described herein can evaluate requests for transfer of cryptographic assets prior to their execution and can determine whether to permit or deny the request. The transaction system can determine that a request is associated with an unapproved and/or fraudulent entity and, in response, deny the request, thereby preventing potential theft of the requested asset. The transaction system can generate a queue of denied requests. The transaction system can provide the queue to a user for review. In response to receiving approval of the request, the transaction system can generate an updated request and transmit the updated request to a transaction processing service (e.g., a blockchain environment or external service for transacting therewith). In response to receiving disapproval of the request, the transaction system may add the intended recipient of the asset to one or more disapproval lists.

The transaction system can monitor transaction queues of blockchain environments. The transaction system can determine that a queued request is associated with a user's cryptographic asset. The transaction system can determine whether the queued request is permissible (e.g., non-fraudulent and intentional). In response to determining that the queued request is not permissible, the transaction system can generate a second request for transfer of the same cryptographic asset from the user's digital wallet to a secure digital wallet associated with the transaction system. The transaction system can transmit the second request to the blockchain environment. The transaction system can transmit the second request with greater priority as compared to the queued request (e.g., by providing additional processing fees, such as additional gas fees). By transmitting the second request with greater priority, the transaction system may cause the blockchain environment to queue and process the second request before the queued request, thereby safely transferring the cryptographic asset to a trusted wallet (e.g., for subsequent repatriation to the user) and preventing execution of the queued request.

The transaction system can generate cryptographic tokens and perform token binding to tether one or more secondary cryptographic tokens to a first cryptographic token. The cryptographic tokens may be stored in digital wallets and used by blockchain environments or other systems to confirm ownership of assets, including cryptographic assets, other digital assets, physical assets, and combinations thereof.

For example, the transaction generates a first token and a second token in a first digital wallet. The first token provides authorization to access to a cryptographic asset. The transaction system binds the second token to the first token such that the second token derives authorization to access the cryptographic asset from the first token. The transaction system uses authorization derived from the first token to transfer the second token to a second digital wallet. The transaction system and/or user uses authorization derived from the first token to transfer the cryptographic asset from the first digital wallet to the second digital wallet (e.g., the second token providing proof of ownership thereof, as derived from the first token). In the event of the second token being stolen from the second digital wallet or otherwise being exposed, the transaction system and/or owner of the first digital wallet may revoke the second token based on their possession of the first token and/or use the superseding authority of the first token to return the cryptographic asset to the first wallet (e.g., or transfer the cryptographic asset to a third digital wallet that includes a third cryptographic token bound to the first cryptographic token). The user may also transfer the second token again back to a designated wallet because the user has ownership and control of the first token. In some embodiments, the user of the second token may be different from the user of the first token (e.g., who may be referred to as a "token owner").

According to a first aspect, a method, comprising: A) identifying, via one of one or more computing devices, a first cryptographic token in a first digital wallet, the first cryptographic token is configured to provide access to a particular resource; B) generating, via one of the one or more computing devices, a second cryptographic token bound to the first cryptographic token; C) transferring, via one of the one or more computing devices, the second cryptographic token to a second digital wallet based on the first cryptographic token; and D) accessing, via one of the one or more computing devices, the particular resource based on the second cryptographic token being in the second digital wallet.

According to a further aspect, the method of the first aspect or any other aspect, wherein generating the second cryptographic token comprises signing the second cryptographic token using a private key associated with the first cryptographic token.

According to a further aspect, the method of the first aspect or any other aspect, wherein transferring the second cryptographic token requires access to the first cryptographic token.

According to a further aspect, the method of the first aspect or any other aspect, wherein the second cryptographic token derives authorization for the particular resource from the first cryptographic token.

According to a further aspect, the method of the first aspect or any other aspect, wherein the first digital wallet comprises at least one additional security feature in comparison to the second digital wallet.

According to a further aspect, the method of the first aspect or any other aspect, further comprising recording the transfer of the second cryptographic token from the first digital wallet to the second digital wallet on a block chain.

According to a further aspect, the method of the first aspect or any other aspect, wherein transferring the second cryptographic token to the second digital wallet requires access to the first cryptographic token.

According to a second aspect, a system, comprising: A) a memory device; and B) at least one computing device in communication with the memory device, wherein the at least one computing device is configured to: 1) identify a first cryptographic token in a first digital wallet, the first cryptographic token is configured to provide access to a particular resource; 2) generate a second cryptographic token bound to the first cryptographic token; 3) transfer the second cryptographic token to a second digital wallet based on the first cryptographic token; and 4) access the particular resource based on the second cryptographic token being in the second digital wallet.

According to a further aspect, the system of the second aspect or any other aspect, wherein transferring the second cryptographic token further comprises the at least one computing device being further configured to: A) generate a contract associated with the transfer comprising a terms for use of the second cryptographic token; and B) cryptographically sign the contract based on a key associated with at least one of: the first cryptographic token or the second cryptographic token.

According to a further aspect, the method of the first aspect or any other aspect, wherein the contract comprises an amount of time for which the second digital wallet may store the second token.

According to a further aspect, the method of the first aspect or any other aspect, wherein the at least one computing device is further configured to: A) determine that the amount of time from when the transfer of the second cryptographic token has elapsed; and B) in response to determining that the amount of time elapsed, transfer the second cryptographic token from the second digital wallet to the first digital wallet.

According to a further aspect, the method of the first aspect or any other aspect, wherein the at least one computing device is further configured to: A) receive a request to designate the second cryptographic token as lendable from a source device; and B) determine whether the request from the source device originated from an owner of the first cryptographic token, wherein the second cryptographic token is transferred subsequent to determining that the request originated from the owner.

According to a further aspect, the method of the first aspect or any other aspect, wherein the second cryptographic token comprises a non-fungible token.

According to a further aspect, the method of the first aspect or any other aspect, wherein the at least one computing device is further configured to determine that the second cryptographic token has been stolen from the second digital wallet.

According to a further aspect, the method of the first aspect or any other aspect, wherein the at least one computing device is further configured to cause the second cryptographic token to be transferred based on the first cryptographic token.

According to a further aspect, the method of the first aspect or any other aspect, wherein the at least one computing device is further configured to retain access of the particular resource via the first cryptographic token.

According to a third aspect, a non-transitory computer-readable medium embodying a program that, when executed by at least one computing device, causes the at least one computing device to: A) identify a first cryptographic token in a first digital wallet, the first cryptographic token is configured to provide access to a particular resource; B) generate a second cryptographic token bound to the first cryptographic token; C) transfer the second cryptographic token to a second digital wallet based on the first cryptographic token; and D) access the particular resource based on the second cryptographic token being in the second digital wallet.

According to a further aspect, the non-transitory computer-readable medium of the third aspect or any other aspect, wherein the resource comprises a physical asset and the first cryptographic token is configured to function as proof of ownership of the physical asset.

According to a further aspect, the non-transitory computer-readable medium of the third aspect or any other aspect, wherein the program further causes the at least one computing device to: A) generate a contract to loan the physical asset for a period of time to a particular user associated with the second digital wallet; and B) transfer the second cryptographic token to the second digital wallet as proof of ownership of the physical asset during the period of time.

According to a further aspect, the non-transitory computer-readable medium of the third aspect or any other aspect, wherein the program further causes the at least one computing device to authorize transferring the second cryptographic token based on confirming the first cryptographic token.

According to a fourth aspect, a method, comprising: A) registering a service with a digital wallet associated with a user account for processing of cryptographic transactions; B) receiving, via the digital wallet, a request to perform a transfer of a cryptographic asset, the request comprising encoded transfer data; C) decoding the encoded transfer data to determine decoded transfer data comprising a source, a destination, an activity; at least one input for the activity, and a digital signature; D) analyzing the decoded transfer data to determine whether to permit the transfer of the cryptographic asset for the request; and E) in response to determining to deny the transfer, storing the request to perform the transfer in a queue for review by the user account.

According to a further aspect, the method of the fourth aspect or any other aspect, wherein registering the service comprises obtaining cryptographic authorization for the digital wallet.

According to a further aspect, the method of the fourth aspect or any other aspect, further comprising: A) receiving approval from the user account for the request from the queue; B) requesting an updated digital signature from the digital wallet; C) encoding updated transfer data comprising the source, the destination, the activity, the at least one input for the activity, and the updated digital signature; and D) sending an updated request comprising the encoded updated transfer data to perform the transfer of the cryptographic asset to a transfer processing service.

According to a fifth aspect, a method, comprising: A) obtaining a cryptographic authorization for a first digital wallet, wherein the first digital wallet is associated with a particular signature; B) monitoring a transaction queue for a blockchain; C) identifying a first transaction in the transaction queue with the particular signature, wherein the first transactions is associated with at least one cryptographic asset in the first digital wallet; D) determining that the first transaction is a fraudulent transaction; and E) in response to determining that the first transaction is a fraudulent transaction, sending a prioritized second transaction into the transaction queue to transfer the at least one cryptographic asset from the first digital wallet into a second digital wallet.

According to a further aspect, the method of the fifth aspect or any other aspect, wherein the first transaction comprises a registration for cryptographic approval to perform a third transaction by a third party and the prioritized second transaction is inserted into the transaction queue before the third transaction, where the third transaction is to transfer the at least one cryptographic asset out of the first digital wallet.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
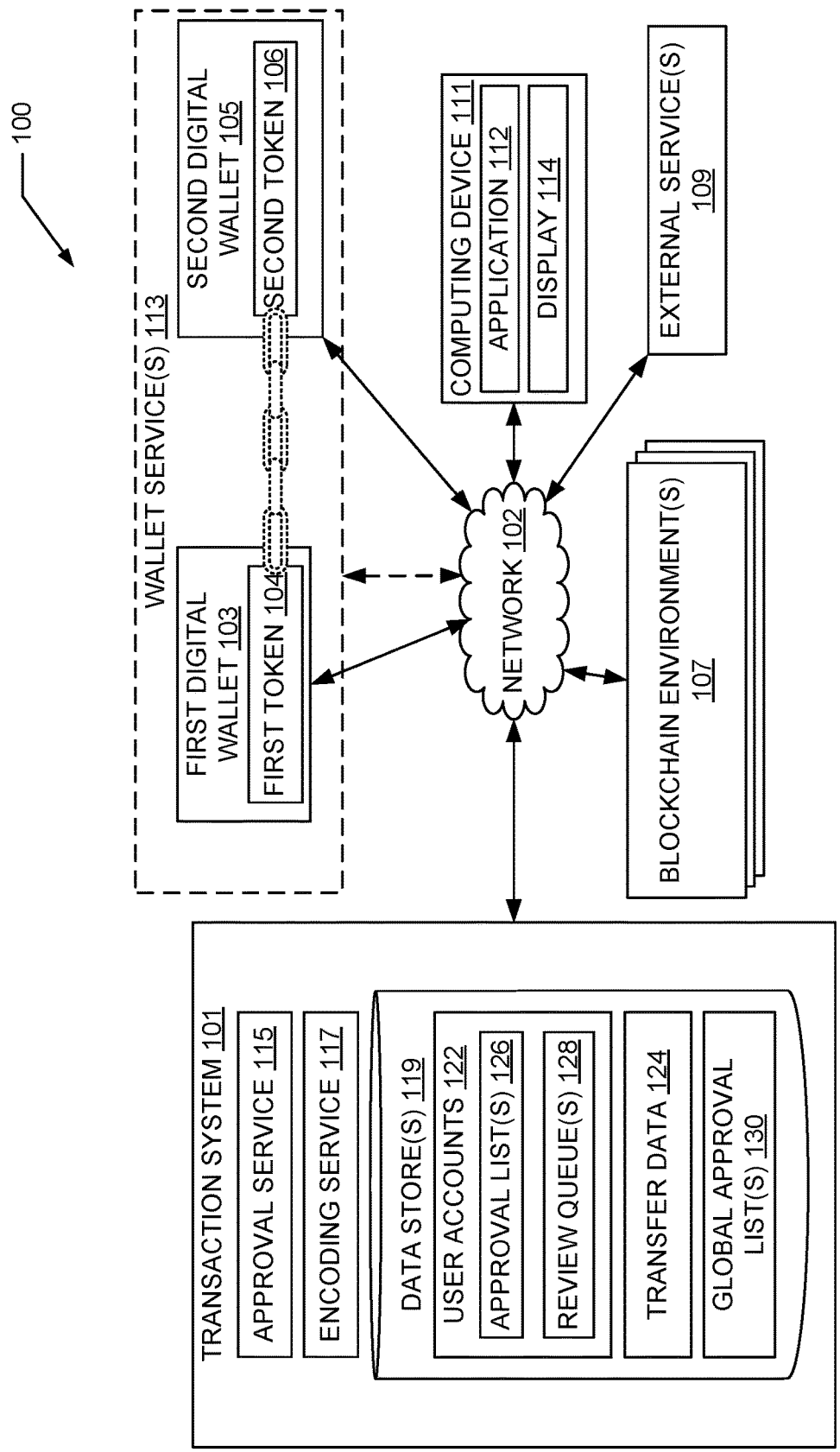
FIG. 1 shows an example network environment in which a transaction system may operate, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Aspects of the present disclosure generally relate to securing cryptographic assets and transfers thereof.

Example Embodiments

Referring now to the figures, for the purposes of example and explanation of the fundamental processes and components of the disclosed systems and processes, reference is made to FIG. 1, which shows an example network environment 100 in which a transaction system 101 may operate, according to one or more embodiments of the present disclosure. As will be understood and appreciated, the example transaction system 101 shown in FIG. 1 represents merely one approach or embodiment of the present system, and other aspects are used according to various embodiments of the present system.

The network environment 100 can include, but is not limited to, the transaction system 101, one or more first digital wallets 103, one or more second digital wallets 105, one or more blockchain environments 107, one or more external services 109, and one or more computing devices 111. In some embodiments, the network environment 100 includes one or more wallet services 113. The transaction system 101 can communicate with the first digital wallet(s) 103, the second digital wallet 105, the blockchain environment(s) 107, the external service(s) 109, the computing device 111, and the wallet service(s) 113 over one or more networks 102. The network 102 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. The transaction system 101 can communicate with a first computing device 111 over a first network 102 and communicate with a second computing device 111, or other element of the network environment 100, over a second network 102.

The first digital wallet 103 and the second digital wallet 105 may each embody a device, program, or combination thereof that stores key conveying cryptocurrency asset ownership, thereby allowing a wallet owner to access cryptocurrency assets associated therewith. The first digital wallet 103 and the second digital wallet 105 may each include a public key (e.g., a wallet address) and a private key. The private key may be used to sign cryptocurrency transactions, such as a transfer of a cryptographic asset. The first digital wallet 103 may be associated with a greater level of security as compared to the second digital wallet 105. For example, the second digital wallet 105 may be accessed via one or more first-level security measures, such as a credential login or user-created pin. In the same example, the first digital wallet 103 may be accessed via one or more second-level security measures, such as more complicated password requirements, two-factor authentication, one or more seed phrases, biometric authentication, one-time passcodes, or combinations thereof. In another example, the first digital wallet 103 is an offline and/or non-Internet-connected storage device (e.g., a "cold" wallet) and the second digital wallet 105 is an online storage device (e.g., a "hot wallet"). In another example, the first digital wallet 103 is a wallet application and the second digital wallet 105 is controlled by an external service 109, such as a cryptocurrency exchange (e.g., Coinbase, Binance, etc.).

The first digital wallet 103 and the second digital wallet 105 may be owned by the same user and associated with the same user account 122 (e.g., or different user accounts 122 associated with the same user). The first digital wallet 103 can include a first token 104. The second digital wallet 105 can include a second token 106. The first token 104 and the second token 106 may be cryptographic tokens (e.g., encrypted strings that may be decrypted via secret data, such as a private key). The second token 106 may be bound to the first token 104. For example, the second token 106 may be signed by a private key associated with the first token 104 and/or first digital wallet 103. The second token 106 may be bound to the first token 104 such that transferring the second token 106 requires access to the first token 104 (e.g., such as a proof of ownership of the first token 104). The second token 106 may derive, from the first token 104, authorization to access and transfer cryptographic assets of the second digital wallet 105.

In some embodiments, the first digital wallet 103 and/or the second digital wallet 105 are associated with a wallet service 113. The wallet service 113 can include a provider of digital wallets, a custodian of digital wallets, a cryptographic asset exchange, or combinations thereof. The wallet service 113 may provide online interfaces by which a user may review their cryptographic assets and initiate various activities, such as asset transfer, asset sale, asset exchange, asset staking, and asset lending. The transaction system 101 may cause the wallet service 113 to adjust online interfaces, such as by adding and configuring various visual indicators. For example, the wallet service 113 may render on a display of a computing device, an online interface including a list of entities that are potential recipients of a cryptographic asset transfer. In this example, the transaction system 101 may cause the wallet service 113 to render a) an "Approved" visual indicator adjacent to entries of the potential recipient list that are included in a list of approved entities, and/or b) a "Disapproved" or "Non-Approved" visual indicator adjacent to entries of the potential recipient list that are included in a list of disapproved entities or are excluded from the list of the of approved entities. In some embodiments, the transaction system 101 is embodied as a plug-in service of the wallet service 113.

The blockchain environment 107 can be any digitally distributed, decentralized, public or private ledger that exists across the network 102, other networks, or combinations thereof. Non-limiting examples of blockchain environments 107 include Bitcoin, Litecoin, Etherium, Cardano, TRON, Algorand, Solana, and Polkadot. The blockchain environment 107 can include a blockchain ledger and a plurality of nodes (e.g., computing devices in communication over one or more networks). When a transfer of a cryptographic asset is requested and authenticated (e.g., by the transaction system 101 as shown and described herein) the blockchain environment 107 can create a block representing the transfer. The blockchain environment 107 can distribute the block to each of the plurality of nodes. The blockchain environment 107 can obtain, from one or more of the plurality of nodes, a validation of the transaction. In response to obtaining the validation, the blockchain environment 107 adds the block to the blockchain ledger and distributes the updated blockchain ledger to the plurality of nodes. The blockchain environment 107 may validate transactions by any suitable process, including proof-of-work processes and proof-of-stake processes.

The blockchain environment 107 and/or any other system on the network 102 can communicate using custom remote procedure calls (RPCs). RPCs can be defined as a communication technique where a client (e.g., a program on the computing device 111 and/or the transaction system 101) can communicate with a remote program on a server system (e.g., the blockchain environment 107) to execute a procedure of the remote program and return a particular response. In the context of the blockchain environment 107 (e.g., Ethereum), the computing device 111 can employ custom RPCs to request blockchain data (e.g., transaction data, smart contract data) from the blockchain environment 107 and/or the wallet services 113.

The computing device 111 and/or the wallet service 113 can include custom RPCs to communicate with the blockchain environment 107. The custom RPCs can define certain communication protocols for communications between the wallet service 113 and the blockchain environment 107. To increase safety, the custom RPCs can optimize the communications performed between the wallet service 113 and the blockchain environment 107. For example, the first digital wallet 103 for a first user can include a first custom RPC generated by the transaction service 101. The first custom RPC can include a whitelist and blacklist of wallets and cryptocurrency exchanges. When the first digital wallet 103 generates a request to communicate with the second digital wallet 105 of a second user, the first digital wallet 103 can perform the request if the second wallet service 113 is identified in the whitelist of the first custom RPC. Continuing this example, the transaction service 101 can generate a second custom RPC for the second digital wallet 105 that defines the communication capabilities of the second digital wallet 105. The first custom RPC and the second custom RPC can be distinct or can be substantially similar. By restricting the amount of locations (e.g., nodes) the wallet service 113 can communicate with, the transaction service 101 can monitor the communications and can restrict communications based on the custom RPC. For example, the custom RPC can keep wallet services 113 from communicating with identified wallets and/or smart contracts that have performed known fraudulent activities.

The transaction service 101 can generate the custom RPCs with varying levels of permissions for each particular wallet service 113. The levels of permissions can define the types of communications the wallet service 113 can perform. For example, the custom RPC can include a first level, a second level, and a third level. At the first level, the wallet service 113 can only request transaction information from the blockchain environment 107. At the second level, the wallet service 113 can only generate transactions for storage on the blockchain environment 107. At the third level, the wallet service 113 can request and generate transactions on the blockchain environment 107. The custom RPCs can include any particular permission infrastructure with varying requirements that define the communication capabilities of the particular wallet service 113. The custom RPC of each wallet can define different levels of permission based on ownership. For example, the custom RPC can only allow full access and control over the second token 106 to the wallet in possession of the second toke 106 (e.g., second digital wallet 105). When the second token 106 is transferred, the transaction service 101 can modify the custom RPCs of the previous owners such that they have reduced permission over the second token 106 as compared to the full access provided to the new owner of the second token 106.

The transaction service 101 can monitor the wallet service 113 to track data associated with the first token 104 and/or the second token 106 using the custom RPCs. For example, the transaction service 101 can monitor, through the custom RPCs, all exchange requests, transfers performed, and/or any other data associated with the second token 106. The transaction service 101, through the custom RPCs, can monitor all exchange requests, transfers performed, and/or any particular data communication associated with the wallet service 113.

The external service 109 may include any external system, application, data store, or platform, and may include additional information or functions accessible to the transaction system 101. The external service 109 may be a transfer processing service that receives and executes transactions for cryptographic assets (e.g., via communication with a corresponding blockchain environment 107). The external service 109 may be a security or threat monitoring service that identifies and collects data associated with fraudulent entities and fraudulent transfers of cryptographic assets. The external service 109 can transmit fraud-associated data to the transaction system 101. The fraud-associated data can include, but is not limited to, digital wallet addresses, URL addresses, user accounts and user profiles (e.g., on digital wallet services, communication platforms, social media platforms, etc.), device data (e.g., IP address, MAC address, geolocation), personal identifiable information (e.g., names, aliases, birthdates, physical addresses, biometrics, etc.), and attack patterns (e.g., digital origin of attack, attack timing, timeline of attack-associated events, victim profiles, assets targeted, target quantities, attack repetition frequency, attack scale, etc.). The external service 109 may be an authentication services, such as a biometric authentication service, two-factor authentication service, or combination thereof. The external service 109 may be an emergency service, such as a cybercrime or fraud department of a law agency. The external service 109 may be a financial system or service, such as, for example, a fraud department of a bank or brokerage.

The computing device 111 can be any network-capable device including, but not limited to, smartphones, computers, tablets, smart accessories, such as a smart watch, key fobs, and other external devices. The computing device 111 can include a processor and memory. The computing device 111 can include an application 112. The application 112 can correspond to a web browser plug-in, a web page, a mobile app, a native application, a service, or other software that can be executed on the computing device 111. The application 112 can access various functions of and data stored by the transaction system 101. The application 112 can process the inputs and transmit commands, requests, or responses to the transaction system 101, the first digital wallet 103, the second digital wallet 105, the blockchain environment 107, the external service 109, the wallet service 113, or other computing devices 111. The application 112 can generate user interfaces for facilitating user interaction with the transaction system 101 and review of activities and information associated therewith. In some embodiments, the application 112 may communicate with other applications or applications installed on the computing device 111 or accessed thereby, such as applications accessed via a web browser. The application 112 may communicate with a mobile application associated with a wallet service 113. The application 112 may augment the wallet service mobile application, such as by rendering indicia indicative of transaction risk or entity (e.g., transaction recipient) risk, by providing, for user review, a list of approved entities, a list of disapproved entities, and/or a transaction review queue.

The computing device 111 can include a display 114 on which various user interfaces can be rendered by the application 112 to configure, monitor, and control the transaction system 101. The computing device 111 can include devices or mechanisms for providing inputs, such as requests and commands, to the application 112. The input device may include, but is not limited to, a keyboard, mouse, pointer, touch screen, speaker for voice commands, camera or light sensing device to reach motions or gestures, or other suitable input device.

The application 112 can communicate with the transaction system 101 to report various data and activities associated with the computing device 111 and other applications accessed or executed thereby. The various data and activities can include, but are not limited to, geolocation data corresponding to the location of the computing device 111, network data corresponding to one or more network connections of the computing device 111, and application data corresponding to applications installed on or accessed by the computing device 111 (e.g., including configurations thereof, such as a particular version, setting, etc.).

The transaction system 101 can include, but is not limited to, an approval service 115, an encoding service 117, and one or more data store 119. The transaction system 101 includes, for example, a Software as a Service (SaaS) system, a server computer, or any other system providing computing capability. Alternatively, the transaction system 101 may employ computing devices that may be arranged, for example, in one or more server banks or computer banks or other arrangements. Such computing devices can be located in a single installation or may be distributed among many different geographical locations. For example, the transaction system 101 can include computing devices that together may include a hosted computing resource, a grid computing resource, and/or any other distributed computing arrangement. In some cases, the transaction system 101 can correspond to an elastic computing resource where the allotted capacity of processing, network, storage, or other computing-related resources may vary over time. In various embodiments, the transaction system 101 (e.g., or one or more elements thereof) may be embodied as one or more of, an online service, an application service, a platform service, a browser feature, a browser plug-in, or a browser web extension.

Various data is stored in the data store 119 that is accessible to the transaction system 101. In some embodiments, the data store 119, or a subset of data stored thereat, can be accessible to the computing device 111 (for example, via the application 112). The data store 119 can be representative of a plurality of data stores as can be appreciated. The data stored in the data store 119, for example, can be associated with the operation of the various applications and/or functional entities described herein. The data store 119 can include, but is not limited to, user accounts 122, transfer data 124, and one or more global approval lists 130.

The user account 122 can be associated with a user of the transaction system 101. The user may be an owner of one or more digital wallets and cryptographic assets associated therewith. The user account 122 may be associated with one or more digital wallets, such as the first digital wallet 103 and one or more second digital wallets 105. The user account 122 may include user-identifying information including, but not limited to, credentials (e.g., username, legal name, password, etc.), public addresses of one or more digital wallets with which the transaction system 101 is registered, information describing cryptographic assets associated with the one or more digital wallets (e.g., quantities and types of cryptocurrencies, identifiers for non-fungible tokens (NFTs), etc.), user location(s), and user contact information (e.g., email address, phone number, usernames on other platforms, such as messaging platforms, etc.). The user account 122 may include data for identifying one or more computing devices 111 associated with a user. The device-identifying data may include, but is not limited to, device identifiers (e.g., model number, serial number, etc.), IP address, MAC address, firmware version, language settings, display dimensions, and other settings or properties of the computing device.

The user account 122 can include one or more approval lists 126. The approval list 126 can identify one or more entities that are approved to initiate or receive transfers of cryptographic assets from digital wallets associated with the user account 122. The approval list 126 can approve an entity to receive any transfer of cryptographic assets. In some embodiments, the approval list 126 restricts transfer approval to a cryptographic asset of a particular type, a maximum quantity or value of a cryptographic asset, a frequency of transfer (e.g., daily, weekly, monthly, yearly, or any suitable interval), or a percentage of a cryptographic asset (e.g., restriction to 10%, 25%, 50%, or any suitable value, of a quantity of a cryptographic asset associated with a digital wallet). The approval list 126 may include public addresses associated with digital wallets of the approved entities. The approval list 126 may include more granular approvals and disapprovals, such as approval of an entity to receive cryptographic asset transfer for particular activities, such as exchange of cryptographic assets, sale of cryptographic assets, or staking cryptographic assets. In some embodiments, the approval list 126 is a disapproval list such that entities included therein are not permitted to receive transfers of cryptographic assets associated with the user account. The disapproval list may include public addresses of digital wallets associated with the disapproved entities. The disapproval list may include, for example, entities associated with suspected or confirmed fraudulent behavior.

The approval service 115 can update the approval list 126 in response to determining that a request is fraudulent or legitimate. For example, in response to receiving manual user approval of a potentially fraudulent request, the approval service 115 may update the approval list 126 to include a new entry corresponding to the intended recipient entity associated with the request. In another example, in response to receiving disapproval of a potentially fraudulent request, the approval service 115 updates a disapproval list to include a new entry corresponding to the intended recipient entity. The approval service 115 can update the approval list 126 to include entities frequently associated with transfers made on behalf of the user account 122.

The user account 122 can include one or more review queues 128. The review queue 128 can include requests that were denied by the transaction system 101 (e.g., due to being potentially fraudulent, being associated with an entry of a disapproval list, or being unassociated with entries of an approval list). The review queue 128 may allow the user account 122 to approve or reject the denied requests. The review queue 128 can include transfer data 124 associated with each request, such as, for example, a requested cryptographic asset, source of the cryptographic asset, intended recipient of the cryptographic asset, intended activity and activity inputs, timestamp of the request, source of the request (e.g., a particular computing device), a geolocation of the source of the request, and a network identifier corresponding to the network by which the request was received. The application 112 can render, on the display 114, user interfaces including the review queue 128, thereby facilitating user review and request management.

The transfer data 124 can include any data or metadata associated with a cryptographic asset-related request. Non-limiting examples of the transfer data 124 include a type of the cryptographic asset to be transferred, an identifier of the cryptographic asset, a quantity of the cryptographic asset, a source of the cryptographic asset an intended destination of the cryptographic asset, an activity, one or more inputs for the activity, and a digital signature associated with the source of the cryptographic asset. The source can be a public address of a digital wallet, such as a public address of the first digital wallet 103. The destination can be a second public wallet address (e.g., associated with a digital wallet controlled by an entity intended as the recipient of the transfer). The activity can include, but are not limited to, asset transfer, asset lending, asset staking, asset exchange or redemption, asset consumption (e.g., as a transaction processing fee, service fee, etc.), contract deployment, and contract execution. The inputs to the activity can include, but are not limited to, value or quantity of the cryptographic asset, fee limit (e.g., gas limit), maximum priority fee, and minimum priority fee. The digital signature can be a cryptographic signature derived from the private key of the source of the cryptographic asset and, in some embodiments, other elements of the transfer data 124.

The global approval list 130 can be an approval list or a disapproval list that is enforced by the approval service 115 for multiple, or all, user accounts 122. In one example, the global approval list 130 includes public wallet addresses of institutional entities, such as, for example public wallet address of an accredited financial institution. In another example, the global approval list 130 is a disapproval list that includes public wallet addresses of entities associated with historical fraudulent activities. The approval service 115 can update the global approval list 130 based on operations of the transaction system 101, or users' interaction therewith. For example, in response to denying a threshold number of requests to transfer assets from one or more user accounts 122 to a particular entity, the application service automatically adds the particular entity to a global disapproval list (e.g., which may cause the transaction system 101 to automatically deny future requests associated therewith). In another example, in response to a predetermined number of user accounts 122 rejecting transfers of cryptographic assets to a particular entity, the transaction system 101 automatically adds the particular entity to a global disapproval list.

The approval service 115 can process, analyze, and control transfers of cryptographic assets. The approval service 115 may embody a plurality of services or subservices for performing the various functions and processes described herein. The various functions and processes may include, but are not limited to, system registration, monitoring transaction activities of blockchain environments 107, receiving and vetting requests for cryptographic asset transfer, generating and transmitting requests for transfers of cryptographic assets, generating and binding cryptographic tokens, and transferring cryptographic tokens between digital wallets.

The approval service 115 can register the transaction system 101 with one or more of the first digital wallet 103, the second digital wallet 105, and the wallet service 113. To register the transaction system 101 with a user's digital wallet, the approval service 115 can obtain cryptographic authorization for the digital wallet. For example, the approval service 115 receives a registration request from a user's computing device 111, the registration request identifying a first digital wallet 103 owned by the user. The approval service 115 processes the registration request, identifies the first digital wallet 103, and transmits, to the user's computing device 111, the first digital wallet 103, or a corresponding wallet service 113, a request for cryptographic authorization for the first digital wallet 103. In response to receiving the cryptographic authorization for the first digital wallet 103, the approval service 115 may update a corresponding user account 122 to include information associated with the digital wallet 103, such as a public address of the first digital wallet 103.

The approval service 115 can register users with the transaction system 101 (e.g., and such registrations may include registering with the transaction system 101 with user-associated digital wallets and/or wallet services). The approval service 115 can generate user accounts 122 and receive, process, and execute inputs related thereto. The approval service 115 can modify properties and settings of the user account 122, as described herein. The approval service 115 can generate and modify data for controlling permissions cryptographic assets transfers. The approval service 115 can generate lists of entities that are approved to receive transfers of cryptographic assets from a user's first digital wallet 103 or second digital wallet 105. The approval service 115 can generate lists of entities that are disapproved (e.g., blocked) from receiving transfers of cryptographic assets from a user's digital wallet(s). The approval list 126 and/or global approval list 130 may embody such lists.

The approval service 115 can permit or deny requests related to a user's cryptographic assets. In one example, a user initiates a request for transfer of a cryptographic asset from their first digital wallet 103 to a digital wallet of a particular entity (e.g., represented by a public wallet address). Before the request is transmitted to a corresponding blockchain environment 107, the transaction system 101 can receive and process the request. The approval service 115 can analyze decoded transfer data 124 from the request to determine whether to permit or deny the transfer of the cryptographic asset for the request. The approval service 115 can determine that the digital wallet of the particular entity is not an entry of an approved entity list associated with a user account 122 of the user. In response to the determination, the approval service 115 can deny the request and perform one or more appropriate actions, such as transmitting an alert to a computing device 111 of the user, storing the request in a queue for review, and/or prompting the user to review and manually approve or withdraw the request.

The approval service 115 can generate requests for transfer of a user's cryptographic assets. The approval service 115 can receive, from a user's computing device, an approval to process a queued request (e.g., the queued request having been originally denied by the transaction system 101). In one embodiment, when a request is queued by the approval service 115, it is effectively denied so to approve the request, the approval service 115 can generate a new request on behalf of the user to effectively handle the approval. The approval service 115 can request an updated digital signature from the user's first digital wallet 103 (e.g., with which the requested cryptographic asset is associated). The approval service 115 can receive the updated digital signature and generate an updated request (e.g., including updated, encoded transfer data 124, see encoding service 117 shown in FIG. 1 and described herein). The approval service 115 can transmit the updated request to a transfer processing service (e.g., embodied as an external service 109 and/or blockchain environment 107).

The approval service 115 can generate global lists of approved or disapproved entities. For example, the approval service 115 determines that a request for transfer of cryptographic transfer to a particular entity (e.g., a particular public wallet address) is fraudulent. In this example, following denial of the request, the approval service 115 may add the particular entity to a global list of disapproved entities. In another example, the approval service 115 receives, from an external service 109, a list of particular entities affiliated with historical fraudulent activities. Based on the indication, the approval service 115 updates a global list of disapproved entities, and/or a disapproved entity list of one or more user accounts 122, to include the list of particular entities. The approval service 115 may also analyze a transaction history the digital wallets of one or more user accounts 122 to determine if any historical transactions thereof are associated with an entry of the list of particular entities.

The approval service 115 can monitor activity occurring within and between blockchain environments 107. The approval service 115 can monitor a transaction queue for a blockchain environment 107. The approval service 115 can determine that a queued transaction is associated with one or more of a user's digital wallet(s), a user's cryptographic asset(s), and a disapproved entity. For example, the approval service 115 receives a transaction queue from the blockchain environment 107. The approval service 115 analyzes the transaction queue and determines that a queued transaction therein includes a signature associated with a user's first digital wallet 103. The approval service 115 also identifies a particular cryptographic asset associated with the request. The approval service 115 determines that the queued transaction is fraudulent (e.g., based on an intended recipient entity, an amount of cryptographic assets requested, or other suitable factors). The approval service 115 generates and transmits, to the transaction queue, a second transaction for the particular cryptographic asset. The approval service 115 transmits the second transaction such that the second transaction is added to the transaction queue with greater priority as compared to the fraudulent transaction. Upon processing at the blockchain environment 107, the prioritized second transaction causes the particular cryptographic asset to be transferred from the user's first digital wallet 103 to a second digital wallet controlled by the transaction system 101, thereby rendering the fraudulent transaction inoperable and preventing the particular cryptographic asset from being transferred to the original intended recipient.

The approval service 115 can generate cryptographic tokens, such as the first token 104 and the second token 106. The cryptographic tokens can provide proof of ownership of digital or physical resources including, but not limited to, cryptocurrencies and non-fungible tokens (NFTs). Based on the cryptographic tokens and/or their presence in a particular digital wallet, the approval service 115 can approve or deny access to the particular resource (e.g., including for purposes of transferring of ownership of the particular resource). The cryptographic tokens generated by the approval service 115 can include public and private identifiers. The approval service 115 can generate a first cryptographic token for authorizing access to a particular resource. The approval service 115 can generate one or more secondary cryptographic tokens. The approval service 115 can bind the one or more secondary cryptographic tokens to the first cryptographic token such that the one or more secondary cryptographic tokens derive authorization to the particular resource from the first cryptographic token.

For example, the approval service 115 generates a first token 104 and a second token 106 in a first digital wallet 103. The approval service 115 binds the second token 106 to the first token 104 by a) generating or accessing a cryptographic signature of the private or public identifier of the first token 104, and b) signing the second token 106 with the cryptographic signature. The approval service 115 transfers the second token 106 from the first digital wallet 103 to a second digital wallet 105 (e.g., both digital wallets being associated with the same user account 122 and/or user). Following the transfer of the second token 106, the particular resource may be accessed (e.g., by the blockchain environment 107, external service 109, transaction system 101, computing device 111, etc.) based on the second token 106 being in the second digital wallet 105.

The approval service 115 can generate a chain of authority based on ownership of the first token 104 and the creation of a logical binding between the first token 104 and one or more second tokens 106. The holder of the second token 106 may be the user associated with the digital wallet 103 or another digital wallet. For example, an owner of the digital wallet 103 may transfer the second token 106 to a second digital wallet owned by a second user. Based on possessing the second token 106, bound to the first token 104, the second user may be granted access and privileges that would otherwise belong to the owner of the digital wallet 103 and the first token 104.

In an example scenario, the approval service 115 generates a first smart contract ("Alpha") that issues a first alpha token to user A, a second alpha token to user B, and a third alpha token to user C. The approval service 115 generates and configures a second smart contract ("Beta") such that beta tokens generated by the second smart contract may only be held and directed (e.g., transferred, retrieved, etc.) according to the owner of a corresponding alpha token (e.g., the beta token being bound to the corresponding alpha token via digital signature or other identifier(s)). The operator(s) of the first smart contract and the second smart contract (e.g., the approval service 115 or another system possessing authority over the smart contracts) configure the smart contracts to derive beta token ownership (e.g., holding the beta token in a digital wallet) from the first contract and alpha token. The operator(s) configure the smart contracts to "honor" the beta tokens of the second smart contract by recognizing the beta tokens as providing, to a holder thereof, one or more accesses or privileges associated with the corresponding alpha token (e.g., possession of the beta token endows benefits of the alpha token). The second smart contract, generates a first beta token bound to the first alpha token, a second beta token bound to the second alpha token, and a third beta token bound to the third alpha token. The users A, B, and C may hold and direct their beta token based on their ownership of the corresponding alpha token. The users A, B, and C may access privileges or assets associated with the alpha token based on their possession of the corresponding beta token. The users A, B, and C may transfer their beta token to another digital wallet (e.g., a self-controlled digital wallet or a digital wallet of another user) while retaining the ability to revoke and/or retrieve the beta token via their ownership of the corresponding alpha token.

Previous cryptographic asset systems may be limited in granting authorization and benefits to a single entity holding a single token. The systems and processes described herein may provide a cryptographic solution in which multiple users holding multiple tokens are granted the same authorization and benefits. In one example, the present system allows a first user to lease and loan non-fungible tokens (e.g., or other cryptographic assets) to a plurality of secondary users. Previous cryptographic asset systems may face risks similar to those posed by bearer bonds (e.g., anyone possessing the asset may exercise ultimate authority and control over the asset). In contrast, the present system can separate control and from authority such that a first user may retain control of a cryptographic asset while permitting a second user to exercise the benefits of holding the cryptographic asset (e.g., based on the second user holding a second cryptographic asset bound to the first cryptographic asset).

The approval service 115 can distribute the second token 106 to one or more first digital wallets 103 and/or to one or more second digital wallets 105. The approval service 115 can generate a contract associated with the transfer of the second token 106 to one or more first digital wallets 103 and/or to one or more second digital wallets 105. The contract can serve as an agreement between the owner of the second token 106 and the recipient of the second token 106. The contract can define distribution, use, licensing agreements, financial agreements, royalties, and/or any other contractual properties associated with the use of the second token 106. For example, the approval service 115 can receive a request to designate the second token 106 as a loanable token. Continuing this example, the approval service 115 can generate the contract associated with the second token 106 to define financial royalties associated with the use of the second token 106 by a third party.

The approval service 115 can automatically generate the contract when generating, linking, or transferring the first token 104 and/or the second token 106. The approval service 115 can store the contract in the transfer data 124. The approval service 115 can link the contract to the user accounts 122 associated with first token 104 and/or the second token 106. The approval service 115 can link the contract directly to the first token 104 and/or the second token 106.

The contract can be associated with the first token 104 and/or the second token 106. For example, the contract can be embedded into the first token 104 and/or the second token 106. In another example, the contract can be a third token stored in the first wallet 103 and/or the second digital wallet 105 and linked to the first token 104 and/or the second token 106. The approval service 115 can cryptographically sign or encode the contract. The approval service 115 can cryptographically sign or encode the contract with the same private/public key pair as the first token 104 and/or the second token 106.

In a non-limiting example use-case of the contract, a first user can store the first token 104 and the second token 106 in the first digital wallet 103. The transaction system 101 can receive a request to designate the second token 106 as a lendable token. The request to designate the second token 106 as the lendable token can be associated with the first token 104, such that the approval service 115 can confirm the request is received from a legitimate owner of the first token 104 and the second token 106. The approval service 115 can generate a contract associated with the transfer of the second token 106 from the first digital wallet 103 of the first user to the second digital wallet 105 of a second user. The contract can define, for example, the amount of time the second digital wallet 105 can store the second token 106, allowable modifications to the second token 106, royalty agreements associated with use of the second token 106, financial agreements associated with use of the second token 106, and/or any particular agreement made between the first user and the second user defining how the second token 106 may be used by the second user. The approval service 115 can cause the second token 106 to be transferred to one or more wallets in response to a condition in the contract being met, such as, for example, the amount of time that the second digital wallet 105 can store the second token 106 expiring.

Once the second token 106 is loaned and transferred to the second digital wallet 105, the transaction system 101 can monitor the use of the second token 106. The transaction system 101 can automatically transfer the second token 106 from the second digital wallet 105 to the first digital wallet 103 in response to identifying misuse (e.g., breach of contract) of the second token 106 as defined in the contract. The transaction system 101 can receive a request from the computing device 111, the application 112, the first digital wallet 103, and/or the first user to return the second token 106 to the first digital wallet 103. For example, the application 112 associated with the first digital wallet 103 and/or the user account 122 can generate a request to return the loaned second token 106 to the first digital wallet 103 connected with the user account 122. Continuing this example, the approval service 115, on recognizing the request was made by the legitimate owner of the first token 104, can extract the second token 106 from the second digital wallet 105 and return the second token 106 to the first digital wallet 103.

Using contracts generated by the approval service 115 can allow the owner of the second token 106 to define agreements when lending the second token 106. For example, the second token 106 can include an NFT. Continuing this example, the second token 106 can include an NFT of a digital art piece. The approval service 115 can generate a contract when the owner of the second token 106 (e.g., as defined as owning the first token 104) lends the digital art piece to a particular art gallery. The contract can define a 2% royalty to the owner of the second token 106 on all ticket sales for the art gallery while in possession of the second token 106.

The second token 106 can be associated with one or more physical goods. The one or more physical goods can include but are not limited to homes, automobiles, office spaces, venue spaces, physical sports memorabilia, and/or any particular physical item. The second token 106 can function as a proof of ownership or a proof of possession of the one or more physical goods. For example, a first user can have the first token 104 linked to the second token 106, where the second token 106 and the first token 104 are tied to a physical rental property in Colorado.

The approval service 115 can generate the contract for the second token 106 associated with the one or more physical goods. The contract associated with the second token 106 for the one or more physical goods can function as an agreement when loaning, renting, and/or otherwise borrowing the one or more physical goods from a first user to a second user. For example, the approval service 115 can generate a contract for loaning a car from a first user to a second user. On loaning the car to the second user, the second digital wallet 105 of the second user can receive the second token 106. By receiving the second token 106, the second user can prove temporary ownership of the car. The contract associated with the transfer of the second token 106 to the second user can include stipulations defining the amount of time the user can have the car, the amount of miles the user can add to the car, accidental damage agreements, and/or any other common agreement made during a car rental procedure. The approval service 115 can monitor the one or more physical goods to determine if a breach of contract has occurred. On recognizing the breach of contract, the approval service 115 can employ the first token 104 tied to the second token 106 to return the second token 106 to the first digital wallet 103 and/or any particular wallet of the particular owner.

Although defined using the term "contract," the contract as discussed herein can include any sort of binding agreement generated by the approval service 115. The binding agreement can include any particular stipulation that defines terms for temporary ownership of the associated second token 106. The binding agreement can be tied to the first token 104 and/or the second token 106. By tying the binding agreement to the first token 104 and/or the second token 106, the transfer of the second token 106 to any particular digital wallet can be governed by the stipulations of the binding agreement.

The approval service 115 and/or the application 112 can generate and cause the rendering of user interfaces that show cryptographic assets of the user account 122 and whether a digital wallet associated therewith is protected by the transaction system 101. In one example, in response to registering the transaction system 101 with a particular digital wallet, the approval service 115 updates a corresponding user account 122 to reflect the registration and, thereby, indicate the protected status of the cryptographic assets associated with the particular digital wallet.

The encoding service 117 can encode and decode transfer data 124. The encoding service 117 can process requests to extract transfer data 124 therein. The encoding service 117 can decode the transfer data 124 such that the decoded transfer data 124 may be analyzed by the approval service 115. The encoding service 117 can (re-)encode transfer data 124 such that the encoded transfer data 124 may be processed by the blockchain environment 107. The encoding and decoding operations of the encoding service 117 can prepare the transfer data 124 for transmission to a particular blockchain environment 107 (e.g., based on data formatting requirements associated therewith) and/or to improve data transmission efficiency. The encoding and decoding operations can account and control for formatting rules (e.g., big-endian, little-endian, middle-endian, mixed-endian, and other byte ordering rules), special character rules, and other data standards.

In one example, the transaction system 101 can receive a request to perform a transfer of a cryptographic asset, the request including encoded transfer data 124. The encoding service 117 can decode the encoded transfer data 124, thereby generating decoded transfer data 124 including, but not limited to, a source of the cryptographic asset (e.g., a public address of a digital wallet associated with the cryptographic asset), a destination of the cryptographic asset, an activity, one or more inputs for the activity, and a digital signature from the digital wallet associated with the cryptographic asset. The approval service 115 can analyze the decoded transfer data 124 to determine whether to permit the transfer of the cryptographic asset for the request (e.g., transfer of the request to the blockchain environment 107 or another transaction processing service). The approval service 115 can determine to deny the transfer and prompts a user account associated with the cryptographic asset to manually review and approve the request. The transaction system 101 can receive approval from the user account for the request. In response to the approval, the transaction system 101 can request an updated digital signature from the digital wallet. The transaction system 101 can receive the updated digital signature and the encoding service 117 can generate second encoded transfer data 124 including the source, the destination, the activity, the one or more inputs for the activity, and the updated digital signature. The approval service 115 can generate an updated request, including the second encoded transfer data 124, and transmit the updated request to the blockchain environment 107 or other transaction processing service (e.g., as specified in the original request).

Figure 2:
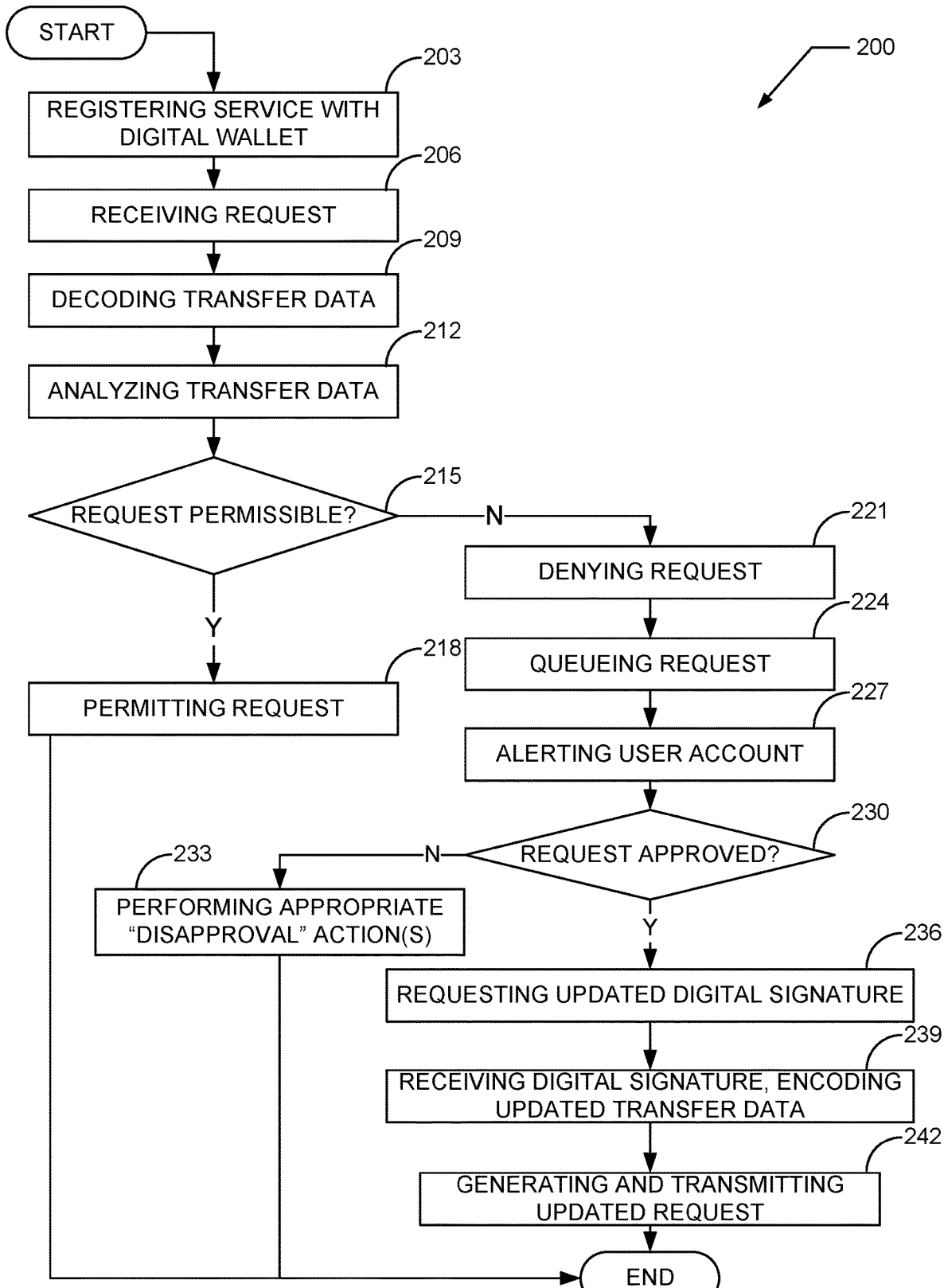
FIG. 2 shows an example request control process, according to one embodiment of the present disclosure.

FIG. 2 shows an example request control process 200 that may be performed by an embodiment of the present transaction systems, such as those shown in the network environment 100 shown in FIG. 1 and described herein. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

At step 203, the process 200 includes registering a service with a digital wallet. The service can be the transaction system 101, in particular, the approval service 115. The digital wallet can correspond to the first digital wallet 103 shown in FIG. 1 and described herein. Following registration, the transaction system 101 may function as an intermediary whereby requests from the first digital wallet 103 for transfer of cryptographic assets are first received into and processed by the approval service 115 before being transmitted to an original intended recipient (e.g., if the request is approved) or denied (e.g., if determined to be impermissible and/or denied by the user account 122 following review).

At step 206, the process 200 includes receiving, from the digital wallet 103, a request to perform a transfer of a cryptographic asset. The approval service 115 can receive the request and associate the request with one or more of a user account 122 and the first digital wallet 103 associated therewith. In some embodiments, the association may occur following decoding step 209 (e.g., association with the user account 122 may be based on the source of the requested cryptographic asset).

The request can include encoded transfer data 124. The encoded transfer data 124 may include encoded representations of information including, but not limited to, transfer source or origin, transfer destination, one or more activities occurring, and one or more inputs to an activity occurring. The transfer origin can include, but is not limited to, a public key of the digital wallet, an exchange identifier, user account information, a timestamp of the request, device-identifying or network-identifying information associated with the request (e.g., internet protocol (IP) address, MAC address, cellular infrastructure data, geolocation data, etc.), or combinations thereof. The transfer destination may include any of the information of the aforementioned transfer origin as applied to an intended recipient of the cryptographic asset, such as, for example, a public key of a recipient wallet, including wallets of exchange services and staking pools. The activity occurring can include, but is not limited to, mining cryptocurrency assets, buying cryptocurrency assets, selling cryptocurrency assets, exchanging a cryptocurrency asset of a first type for a cryptocurrency of a second type, exchanging cryptocurrency assets for physical or other digital assets (e.g., non-fungible tokens (NFTs), transferring a cryptocurrency asset from a first wallet to a second wallet, paying blockchain processing fees (e.g., gas fees), staking a cryptocurrency asset, lending a cryptocurrency asset, gambling a cryptocurrency asset, and combinations thereof. The input(s) to the activity occurring can include, but are not limited to, a quantity of the cryptocurrency asset, class or type of the cryptocurrency asset, information that identifies an asset or service to-be-received in exchange for the cryptocurrency asset, maximum priority fees, minimum priority fees, and combinations thereof.

At step 209, the process 200 includes decoding the encoded transfer data 124. The encoding service 117 can decode the encoded transfer data 124 to generate decoded transfer data 124. The decoded transfer data 124 can be of a format suitable for analysis by the approval service 115. The encoding service 117 may process data from the transfer request to populate one or more data variables in the encoded transfer data 124 to generate the decoded transfer data 124. As an example, the encoding service 117 may decode data from an encoded text from the encoded transfer data 124 to generate a binary format in the decoded transfer data 124. As another example, the encoding service 117 may reorder bytes of data (e.g. changing from big to little endian or vice versa) in the encoded transfer data 124 to fit a particular data storage format. The encoding service 117 can remove or add padding or command escape sequences from the encoded transfer data 124 to generate the decoded transfer data 124. The encoding service 117 can decompress or decrypt various portions of the encoded transfer data 124 to generate the decoded transfer data 124.

At step 212, the process 200 includes analyzing the decoded transfer data 124. The approval service 115 can analyze the intended recipient of the requested transfer is included in an approval list 126, a global approval list 130, and/or a disapproval list. The approval service 115 can analyze the requested cryptographic asset and, based on settings of the user account 122 and/or other rules, determine whether the cryptographic asset is approved or disapproved for transfer. The approval service 115 can determine whether the requested quantity of the cryptographic asset is approved or disapproved for transfer (e.g., by comparing the quantity to one or more predetermined thresholds). The approval service 115 can determine whether the requested quantity of the cryptographic asset exceeds a predetermined percentage of a user's total assets (e.g., of the same asset type, multiple asset types, or all asset types, including whether said assets are associated with the user's first digital wallet 103 or one or more second digital wallet 105). The approval service 115 can determine other properties of the request, such as a geolocation of a computing device from which the request was received, whether the request was received from a user's computing device 111, a network associated with transmission of the request, or a timestamp associated with transmission of the request.

At step 215, the process 200 includes determining whether the request is permissible based on the analysis of step 212. In response to determining that the intended recipient is not on an approval list 126 and/or global approval list 130, the approval service 115 may determine that the request is not permissible. In response to determining that the requested quantity of the cryptographic asset exceeds a predetermined threshold, the approval service 115 may determine that the request is not permissible. In response to determining that the intended recipient is included in the approval list 126 and/or global approval list 126, the approval service 115 may determine that the request is permissible. In response to determining that metadata of the request falls outside of user settings and/or historical user activities, the application service may determine that the request is not permissible. Non-limiting examples of user settings and historical user activities include request timestamp (e.g., requests made outside of normal activity periods may be fraudulent), geolocation of the computing device from which the request was received (e.g., requests from outside one or more geozones, or within other geozones, may be fraudulent), and device data of the request-transmitting computing device (e.g., requests associated with a computing device that is different from a historically used computing device may be fraudulent).

In response to the approval service 115 determining that the request is permissible, the process 200 may proceed to step 218. In response to the approval service 115 determining that the request is not permissible, the process 200 may proceed to step 221.

At step 218, the process 200 includes permitting the request. The approval service 115 can transmit the request (e.g., including the encoded transfer data 124) to a transaction processing service, such as the blockchain environment 107 or an external service 109. In some embodiments, the approval service 115 requests an updated digital signature from the first digital wallet 103. The transaction system 101 can receive the updated digital signature from the first digital wallet 103. The encoding service 117 can generate second encoded transfer data 124 including the updated digital signature, the transfer source, the transfer destination, the activity, and the one or more inputs for the activity.

In some embodiments, the transaction system 101 and/or the application 112 perform additional appropriate actions. The transaction system 101 can transmit a notification of transfer approval to the computing device 111. The application 112 can render, on the display 114, a confirmation of the transfer. The transaction system 101 or application 112 can update a user interface to include a badge or other indicia that indicates the intended recipient of the request (e.g., the destination) is an approved entity.

At step 221, the process 200 includes denying the request. The approval service 115 can preventing the request from being transmitted to blockchain environment 107 or external service 109.

At step 224, the process 200 includes queueing the request. The approval service 115 can store the denied request in a review queue 128 of the user account 122. The approval service 115 may store the decoded transfer data 124 for various purposes including, but not limited to, additional analysis, training machine learning models to identify fraudulent requests, and generating additional entries to one or more disapproval lists.

At step 227, the process 200 includes alerting the user account 122 associated with the request (e.g., an owner of the cryptographic asset associated with the request). The approval service 115 can transmit an alert to the user account 122 or the computing device 111 associated therewith. The alert can include any suitable format including, but not limited to, electronic mail, push notification, application notification (e.g., via the application 112), text message, and voicemail. The application 112 can receive or generate the alert and cause the display 114 to render the alert. The alert can include, but is not limited to, the decoded transaction data 124 and request metadata, such as request timestamp, geolocation of the request-transmitting computing device, and a profile of the request-transmitting computing device (e.g., including device data thereof, such as contact information, device identifier(s), etc.).

At step 230, the process 200 includes determining whether the request is approved by the user account 122 (e.g., the owner of the cryptographic asset). The transaction system 101 may receive and process an input from the computing device 111 (e.g., via the application 112 or otherwise). The input may include an indication of approval or disapproval of the denied request. In some embodiments, determining whether the request is approved includes accessing and applying one or more settings of the user account 122. For example, a user account 122 may include a rule that requests associated with non-approved entities may be approved if the requested asset value is less than a predetermined threshold. The approval service 115 may compare a quantity of the request-specified cryptographic asset to the predetermined threshold. In response to the quantity satisfying the predetermined threshold, the approval service 115 may determine the request is disapproved. In response to the quantity failing to satisfy the predetermined threshold, the approval service may determine the request is approved. In some embodiments, the approval service 115 prompts the user account 122 to perform one or more authentication challenges to approve the request. The authentication challenge can include, but is not limited to, biometric authentication, multi-factor authentication, one-time password, or combinations thereof.

In response to the transaction system 101 determining that the request is not approved, the process 200 may proceed to step 233. In response to the transaction system 101 determining that the request is approved, the process 200 may proceed to step 236.

At step 233, the process 200 includes performing one or more appropriate "disapproval" actions. The transaction system 101 can transmit an alert to the user's computing device 111. The alert can indicate the cancellation of the request and can include one or more reasons for the cancellation (e.g., unapproved recipient, threshold-exceeding request, etc.).

At step 236, the process 200 includes requesting an updated digital signature from the digital wallet of step 203. The approval service 115 can request an updated digital signature from the first digital wallet 103. The digital wallet 103 can generate updated digital signature and transmit the updated digital request to the transaction system 101 (e.g., based on the transaction system 101 having been registered with the digital wallet).

At step 239, the process 200 includes receiving the updated digital signature and encoding updated transfer data 124 (e.g., the updated transfer data 124 including the updated digital signature). The encoding service 117 can generate the updated transfer data 124 by encoding the updated digital signature, the transfer source or origin, the transfer destination, the activity occurring, and the one or more inputs to the activity.

At step 242, the process 200 includes generating and transmitting an updated request. The approval service 115 can generate an updated request to transfer the cryptographic asset. The approval service 115 can transmit the updated request to the transaction processing service (e.g., blockchain environment 107 or external service 109). In some embodiments, in response to the approval service 115 transmitting the updated request, the transaction system 101 transmits a confirmation of the request transmission to the user account 122 or computing device 111 associated therewith.

Figure 3:
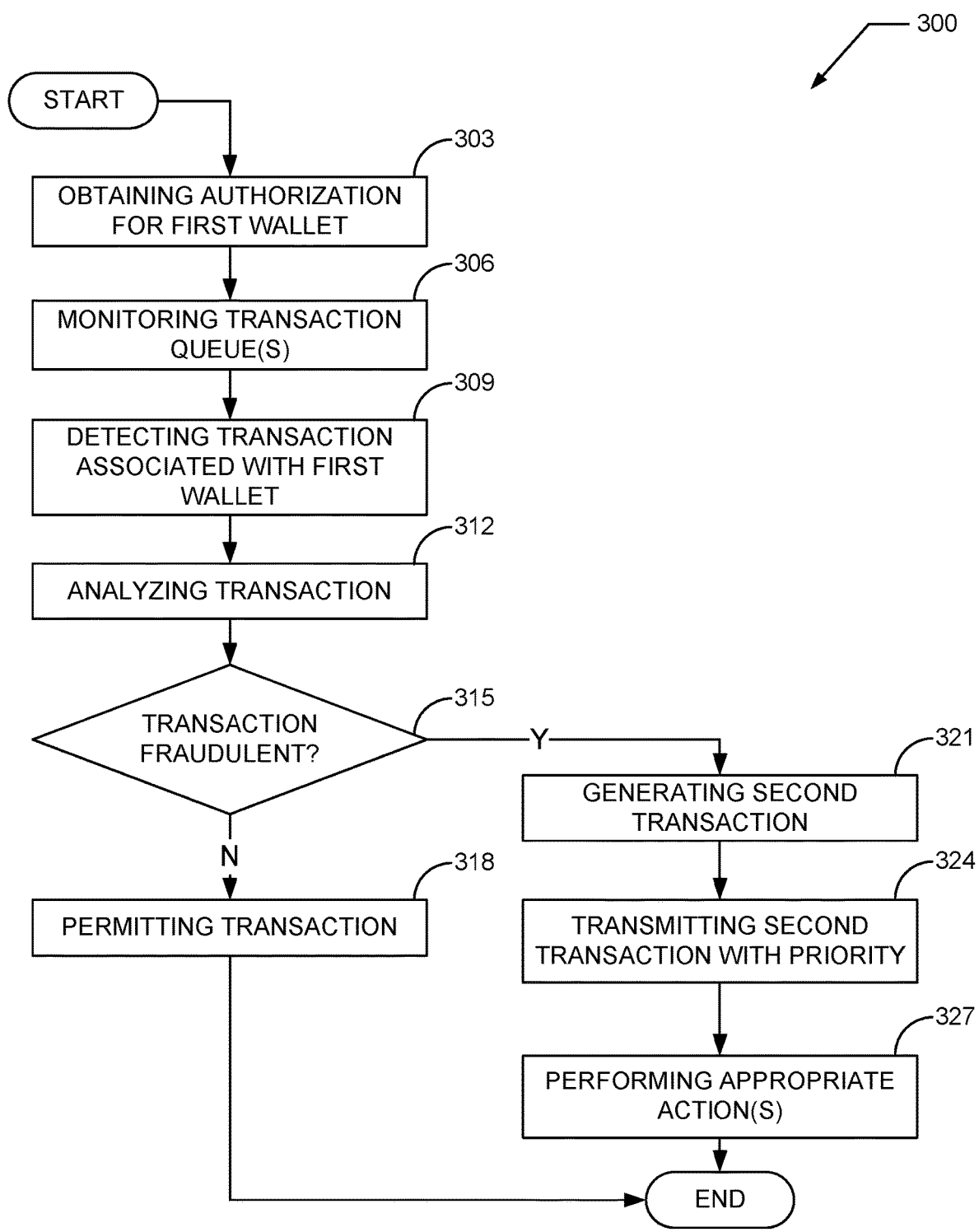
FIG. 3 shows an example monitoring process, according to one embodiment of the present disclosure.

FIG. 3 shows an example monitoring process 300 that may be performed by an embodiment of the present transaction systems, such as the transaction system 101 shown in FIG. 1 and described herein.

At step 303, the process 300 includes obtaining, on behalf of the transaction system 101, a cryptographic authorization for a first digital wallet 103. The first digital wallet 103 may be associated with a particular digital signature. The transaction system 101 may obtain the cryptographic authorization via a registration operation. The registration operation may be performed similar to step 203 of the process 200 shown in FIG. 2 and described herein.

At step 306, the process 300 includes monitoring transaction queues of one or more blockchain environments 107. The approval service 115 can retrieve the transaction queue from the blockchain environment 107. The transaction queue can include one or more queued requests for transfers of cryptographic assets. The request can include, but is not limited to, a signature, transfer data 124 (e.g., which may be in an encoded format), and metadata (e.g., a timestamp of the request origin, an indication of priority status, an indication of maximum priority fee, etc.).

At step 309, the process 300 includes detecting a particular queued transaction in the transaction queue that is associated with the first digital wallet 103. The approval service 115 can compare the signature of each queued request to the particular signature of the first digital wallet 103. The approval service 115 can detect the particular queued transaction based on matching the signature thereof to the particular digital signature. The approval service 115 can detect multiple queued transactions associated with the first digital wallet 103.

At step 312, the process 300 includes analyzing the queued transaction detected at step 309. The transaction system 101 can perform a request control process 200, as shown in FIG. 2 and described herein, to determine whether the request is permissible. The encoding service 117 may access encoded transfer data 124 of the queued transaction and generate decoded transfer data 124 based thereon. The approval service 115 can analyze the decoded transfer data 124 to determine if an intended recipient is included on an approval list 126, global approval list 130, or a disapproval list. The approval service 115 may apply other rules to decoded transfer data 124, such as, for example, determining whether the requested cryptographic exceeds a predetermined value or exceeds a predetermined percentage of overall value of assets in the first digital wallet 103. Additional examples of rules include, but are not limited to, request geolocation, request timestamp, and identity of the computing device from which the request was transmitted to the blockchain environment 107.

At step 315, the process 300 includes determining whether the queued transaction is fraudulent based on the analysis of step 312. In addition to illegal and illicit activities, fraudulence may include accidental actions, such as, for example, initiating a request for a greater amount of a cryptographic asset than is intended (e.g., attempting to transfer 100% of holdings instead of an intended 10%, transferring a particular cryptographic asset in place of an intended second cryptographic asset, incorrectly inputting a wallet address of an intended recipient, etc.). The approval service 115 can perform step 315 similar to 215 and/or 230 of the process 200.

In response to determining that the queued transaction is not fraudulent, the process 300 may proceed to step 318. In response to determining that the queued transaction is fraudulent, the process 300 may proceed to step 321.

At step 318, the process 300 includes permitting the queued transaction. In some embodiments, step 318 includes transmitting a notification of the queued transaction to the user account 122 associated with the first digital wallet 103.

At step 321, the process 300 includes generating a second transaction. The approval service 115 and/or encoding service 117 can duplicate the queued transaction into a second transaction, replacing the transfer destination thereof with a trusted destination. The second transaction includes a recipient wallet address for a digital wallet controlled by the transaction system 101 and/or a trusted external service 109, such as a digital wallet controlled by a banking institution. The second transaction includes the cryptographic asset specified in the queued transaction. The second transaction includes the particular signature corresponding to the first digital wallet 103.

At step 324, the process 300 includes transmitting the second transaction to the transaction queue with a priority level greater than a priority level of the queued transaction. The approval service 115 can transmit the second transaction to the blockchain environment 107 or other transaction processing service from which the queued transaction was detected. The transaction system 101 can remit payment of prioritization fees from a digital wallet controlled thereby, from the first digital wallet 103, or one or more second digital wallets 105 associated with the same user account 122 as the first digital wallet 103. The greater priority of the second transaction causes the transaction processing service to process the second transaction before the queued transaction, thereby preventing the queued transaction from accessing the cryptographic asset.

In some embodiments, the queued transaction is a registration for cryptographic approval of a third party to perform an additional queued transaction for transfer of a cryptographic asset out of the first digital wallet 103. The approval service 115 can transmit the second transaction (e.g., the transaction generated at step 321) with a priority level greater than both the queued transaction and the additional queued transaction. In some embodiments, the approval service 115 may transmit the second transaction with a priority level greater than only the additional queued transaction (e.g., as the compromised first digital wallet 103 may be discarded from future use following safe ejection of the requested cryptographic asset).

At step 327, the process 300 includes performing one or more appropriate actions. The transaction system 101 can transmit an alert to the user account 122 and/or computing device 111 associated therewith. The alert can describe the detected fraudulent transaction and steps taken to mitigate the fraudulent activity. The alert can identify the trusted digital wallet to which the cryptographic asset was transferred. The alert can include instructions for retrieving the cryptographic asset, including a description of any service or maintenance fees owed to the transaction system 101. The transaction system 101 can generate an additional transaction to transfer the asset to another digital wallet of the user account 122. The transaction system 101 may receive, from the user account 122 or computing device 111, a public address of an additional digital wallet. The transaction system 101 may prompt the user account 122 to perform one or more authentication challenges. In response to receiving the public address and/or confirming successful completion of the authentication challenge(s), the transaction system 101 transfers the cryptographic asset to the additional digital wallet (e.g., via generating and transmitting a request to the corresponding transaction processing service).

Figure 4:
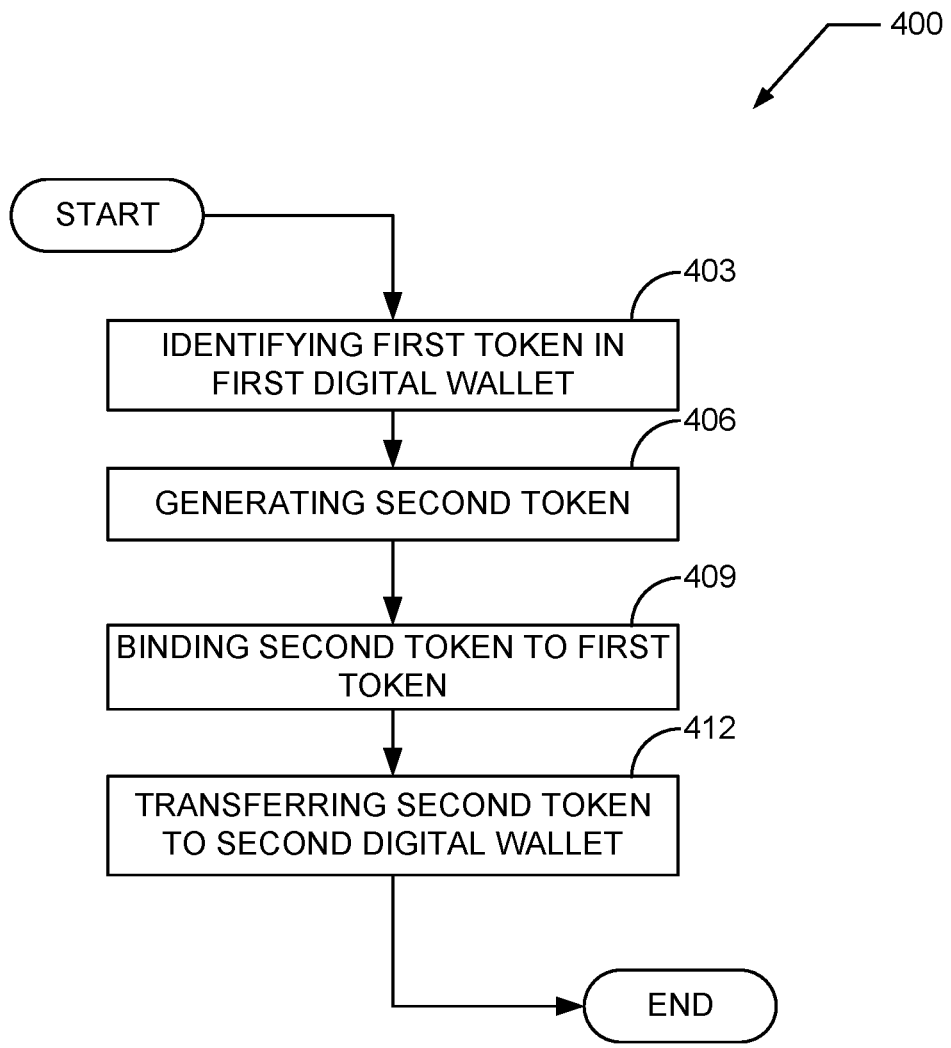
FIG. 4 shows an example token binding process, according to one embodiment of the present disclosure.

FIG. 4 shows an example token binding process 400 that may be performed by an embodiment of the present transaction systems, such as the transaction system shown in FIG. 1 and described herein.

At step 403, the process 400 includes identifying a first token in a first digital wallet. The first token can correspond to the first token 104 shown in FIG. 1 and described herein. The approval service 115 can identify a first token 104 in a first digital wallet 103. The first token 104 may be a cryptographic token. For example, the first token 104 may be signed by a digital signature derived from a private key of the first digital wallet 103. The first token 104 may include a public key and a private key. The public key may be a token identifier. The private key may be used to generate proof of ownership of the first token 104, such as by deriving a digital signature based thereon. The first token 104 may be pre-configured to provide access to a particular resource in the first digital wallet 103 or another digital wallet. The particular resource may include cryptographic assets, such as cryptocurrency, one or more non-fungible tokens (NFTs), and privileges associated with ownership of the NFT (e.g., access to a particular digital or physical environment, invitations to exclusive events, and rewards, such as exclusive digital content).

At step 406, the process 400 includes generating a second token within the first digital wallet 103. The second token can correspond to the second token 106 shown in FIG. 1 and described herein. The approval service 115 can generate a second token 106.

At step 409, the process 400 includes binding the second token 106 to the first token 104. The approval service 115 can bind the second the second token 106 to the first token 104 by generating a digital signature based on the private key of the first token 104 and signing the second token 106 with the digital signature. The binding of the second token 106 to the first token 104 may result in future transfers of the second token 106 requiring access to the first token 104 (e.g., for proof of ownership or authorization and/or for generation of updated digital signatures). By binding the second token 106 to the first token 104, the second token 106 may derive, from the first token 104, authorization to the particular resource.

At step 412, the process 400 includes transferring the second token to a second digital wallet. The transaction system 101 can generate and transmit a request that causes the second token 106 to be transferred to a second digital wallet 105. The first digital wallet 103 and the second digital wallet 105 may be associated with the same or different user accounts 122. The first digital wallet 103 may include one or more additional security features as compared to the second digital wallet 105 (e.g., stricter password requires, biometric authentication, multi-factor authentication, restricted use windows, etc.).

Figure 5:
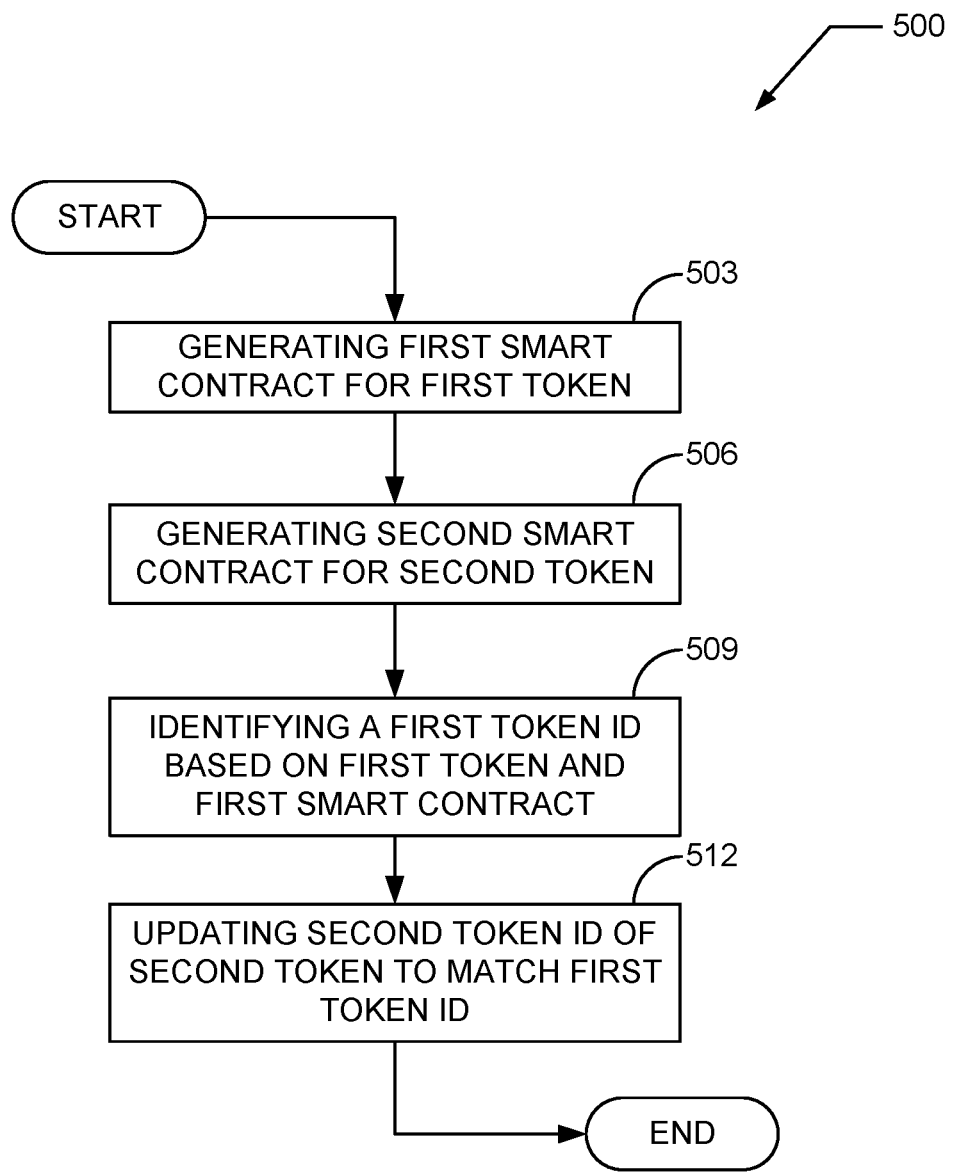
FIG. 5 shows a second example token binding process, according to one embodiment of the present disclosure.

Referring now to FIG. 5, illustrated is a second example token binding process 500, according to one embodiment of the present disclosure. The process 500 can illustrate a technique for binding the second token 106 and/or any other token to the first token 104. By binding the first token 104 and the second token 106, the particular resource can be accessed based on the presence of the second token 106 in the second digital wallet 105. For example, the particular resource is an NFT that may be transferred or otherwise accessed based on the second token 106 and the authorization associated therewith as result of being bound to the first token 104. If the second token 106 is stolen or otherwise compromised, the owner of the first digital wallet 103 (e.g., or the transaction system 101, if authorized) may retain access to the particular resource via the first token 104. The owner may also transfer the second token 106 out of the second digital wallet 105 (e.g., or another wallet, if already transferred out of the second digital wallet 105) based on their possessing the first token 104. For example, the first digital wallet 103 may generate an alert that the second token 106 is stolen. On receiving the alert that the second token 106 is stolen, the first smart contract associated with the first token 104 can trigger code that retrieves the second token 106 from the second digital wallet 105 and store the second token 106 in the first wallet 103 of the owner. As another example, the application 112 can receive an indication to transfer the second token 106 to a particular wallet (e.g., the first digital wallet 103) based on ownership of the first token 104 (e.g., if the token is stolen). The second token 106 may have contractual terms via a smart contract indicating that an owner of the first token 104 can move the second token 106 to a particular wallet. When accessing the particular resource, the second token 106 may be used in place of the first token 104 as proof of ownership (e.g., thereby preventing potential unwanted exposure of the more authoritative first token 104 by use of the lower authority token 106 as a form of receipt).

At box 503, the process 500 can include generating a first smart contract for the first token 104. A smart contract can be defined as a particular code associated with a particular token that can execute when one or more conditions are met. The transaction system 101 can generate the first smart contract for the first token 104. The first smart contract for the first token 104 can include various conditions associated with the first token 104. For example, the various conditions can include, use parameters (e.g., code defining how the first token 104 can be used), distribution parameters (e.g., code defining how the first token 104 can be distributed), financial parameters (e.g., code defining the financial conditions associated with the use of the first token 104), and/or any other quantifiable and codeable action associated with the first token 104.

In one embodiment, the transaction system 101 can employ an Ethereum Virtual Machine (EVM) system (or other system) to generate the first smart contract. For example, the system 101 can generate the code for the first smart contract through the EVM system. Continuing this example, the transaction system 101 can employ Solidity, Vyper, Python, Yul, and/or any other adequate programming language used by the EVM system to generate the code for the first smart contract. The code generated by the transaction system 101 can define the various stipulations associated with the first token 104.

At box 506, the process 500 can include generating a second smart contract for the second token 106. The computing system 101 can generate the second smart contract for the second token 106. In some embodiments, the second smart contract can be generated when the second token 106 is generated and be embedded within the second token 106. The second smart contract for the second token 106 can include various code associated with the first token 104. For example, the second smart contract can include code that copies the code from the first smart contract such that the second smart and the first smart contract share similar code. The transaction system 101 can generate code for the second smart contract that, when executed, causes the second smart contract to identify one or more token IDs associated with the first token 104. Further discussion on the identification of the token IDs can be found in the description of box 509

Similar to the first smart contract, the transaction system 101 can employ the EVM system or another system to generate the second smart contract. For example, the system 101 can generate the code for the second smart contract through the EVM system. Continuing this example, the transaction system 101 can employ Solidity, Vyper, Python, Yul, and/or any other adequate programming language used by the EVM system to generate the code for the second smart contract.

At box 509, the process 500 can include identifying a first token ID based on the first token 104 and the first smart contract. The second smart contract of the second token 106 can include code that, when executed, causes the second smart contract to identify the first token ID associated with the first token 104. The second smart contract can identify the first token ID associated with the first token 104 by identifying the first digital wallet 103 associated with the first token 104. The second smart contract can query the first digital wallet 103 to identify the first token 104 associated with the first smart contract. For example, on the Ethereum ecosystem, the second smart contract can record a first smart contract address of the first smart contract as the first token ID of the first token 104. In another example, on the bitcoin ecosystem, the second smart contract can record the issuer's bitcoin address as the first token ID for the first token 104. The second smart contract can have one or more sets of code that execute different token ID identification techniques based on the ecosystem used to generate the first token 104.

At box 512, the process 500 can include issuing a second token ID for the second token 106 to match the first token ID of the first token 104. The second smart contract can issue the second token ID of the second token 106 based on the identified first token ID of the first token 104. On issuing the second token ID of the second token 106 such that the first token ID and the second token ID match, the second token 106 and the first token 104 can be linked. By defining the second token ID as the first token ID, the owner of the first token 104 can have full control over the second token 106. For example, the owner of the first token 104 can lend the second token 106 for a predefined period of time as defined by a smart contract and retrieve the second token 106 on completion of the particular period of time.

Though process 500 is illustrated as ordered from box 506 to box 512, the order of process 500 can be any particular order. For example, the identification of the first token ID can occur before the generation of the second smart contract such that when the second smart contract is generated, the transaction system 101 and/or the blockchain environment 107 can issue the second smart contract with the first token ID of the first token 104.

Referring now to a general application of the process 500, the transaction system 101 and/or the blockchain environments 107 can employ the process 500 to implement various particular use case scenarios. For example, the transaction system 101 can implement the process 500 to define a multi-tier membership service. The transaction system 101 can use the first token 104 and one or more tokens bound to the first token 104 to validate the multi-tier membership of an original membership owner. For example, an entity can decide to create a multi-tier membership service, where each tier has greater benefits than the previous tier. The first token 104 can define the initial base tier of the membership service. Each subsequent token generated and bound to the first token 104 can define higher tiers relative to the first tier defined by the first token 104. By using the process 500 to link the subsequent tokens to the first token 104, the original membership owner can demonstrate ownership of the base membership while also demonstrating further ownership of higher membership tiers. Additionally, the original membership owner of the first token 104 can momentarily loan the additional benefits of a membership tier by sending one or more tokens linked to the first token 104 to a particular user. For example, the original membership owner can have a second tier of a membership by possessing the second token 106 linked to the first token 104. By possessing the second token 106, the original membership owner has access to one or more unique shows only offered to members at that particular tier. The original membership owner can send the second token 106 to a user such that the user can have access to the unique shows when the original membership owner cannot make it to the unique shows. The transaction system 101 can trigger a smart contract such that the second token 106 is returned to the original membership owner once the desired condition of the smart contract is met.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, example screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are example and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the example embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the example embodiments described therein.

What is claimed is:

1. A method, comprising:
    identifying, via one of one or more computing devices, a first cryptographic token in a first digital wallet, the first cryptographic token is configured to provide access to a particular resource;
    generating, via one of the one or more computing devices, a second cryptographic token bound to the first cryptographic token;
    transferring, via one of the one or more computing devices, the second cryptographic token to a second digital wallet based on the first cryptographic token; and
    accessing, via one of the one or more computing devices, the particular resource based on the second cryptographic token being in the second digital wallet.

2. The method of claim 1, wherein generating the second cryptographic token comprises signing the second cryptographic token using a private key associated with the first cryptographic token.

3. The method of claim 1, wherein transferring the second cryptographic token requires access to the first cryptographic token.

4. The method of claim 1, wherein the second cryptographic token derives authorization for the particular resource from the first cryptographic token.

5. The method of claim 1, wherein the first digital wallet comprises at least one additional security feature in comparison to the second digital wallet.

6. The method of claim 1, further comprising recording the transfer of the second cryptographic token from the first digital wallet to the second digital wallet on a block chain.

7. The method of claim 1, wherein transferring the second cryptographic token to the second digital wallet requires access to the first cryptographic token.

8. A system, comprising:
    a memory device; and
    at least one computing device in communication with the memory device, wherein the at least one computing device is configured to:
        identify a first cryptographic token in a first digital wallet, the first cryptographic token is configured to provide access to a particular resource;
        generate a second cryptographic token bound to the first cryptographic token;
        transfer the second cryptographic token to a second digital wallet based on the first cryptographic token; and
        access the particular resource based on the second cryptographic token being in the second digital wallet.

9. The system of claim 8, wherein transferring the second cryptographic token further comprises the at least one computing device being further configured to:
    generate a contract associated with the transfer comprising a terms for use of the second cryptographic token; and
    cryptographically sign the contract based on a key associated with at least one of: the first cryptographic token or the second cryptographic token.

10. The system of claim 9, wherein the contract comprises an amount of time for which the second digital wallet may store the second token.

11. The system of claim 10, wherein the at least one computing device is further configured to:
    determine that the amount of time from when the transfer of the second cryptographic token has elapsed; and
    in response to determining that the amount of time elapsed, transfer the second cryptographic token from the second digital wallet to the first digital wallet.

12. The system of claim 8, wherein the at least one computing device is further configured to:
    receive a request to designate the second cryptographic token as lendable from a source device; and
    determine whether the request from the source device originated from an owner of the first cryptographic token, wherein the second cryptographic token is transferred subsequent to determining that the request originated from the owner.

13. The system of claim 8, wherein the second cryptographic token comprises a non-fungible token.

14. The system of claim 8, wherein the at least one computing device is further configured to determine that the second cryptographic token has been stolen from the second digital wallet.

15. The system of claim 14, wherein the at least one computing device is further configured to cause the second cryptographic token to be transferred based on the first cryptographic token.

16. The system of claim 14, wherein the at least one computing device is further configured to retain access of the particular resource via the first cryptographic token.

17. A non-transitory computer-readable medium embodying a program that, when executed by at least one computing device, causes the at least one computing device to:
    identify a first cryptographic token in a first digital wallet, the first cryptographic token is configured to provide access to a particular resource;
    generate a second cryptographic token bound to the first cryptographic token;
    transfer the second cryptographic token to a second digital wallet based on the first cryptographic token; and
    access the particular resource based on the second cryptographic token being in the second digital wallet.

18. The non-transitory computer-readable medium of claim 17, wherein the resource comprises a physical asset and the first cryptographic token is configured to function as proof of ownership of the physical asset.

19. The non-transitory computer-readable medium of claim 18, wherein the program further causes the at least one computing device to:
    generate a contract to loan the physical asset for a period of time to a particular user associated with the second digital wallet; and transfer the second cryptographic token to the second digital wallet as proof of ownership of the physical asset during the period of time.

20. The non-transitory computer-readable medium of claim 18, wherein the program further causes the at least one computing device to authorize transferring the second cryptographic token based on confirming the first cryptographic token.

* * * * *